United States Patent
Wilhelm et al.

(10) Patent No.: US 6,825,239 B2
(45) Date of Patent: Nov. 30, 2004

(54) SILICO-ACRYLIC COMPOSITIONS: METHOD FOR THEIR PREPARATION AND USE

(75) Inventors: Didier Wilhelm, Issy les Moulineaux (FR); Armand Eranian, Courbevoie (FR); Ngoc Can Vu, Paris (FR); Philippe Vincent, Compiegne (FR)

(73) Assignee: Clariant (France) SA, Puteaux (FR)

( * ) Notice: Subject to any disclaimer, the term of this patent is extended or adjusted under 35 U.S.C. 154(b) by 0 days.

(21) Appl. No.: 09/821,876

(22) Filed: Mar. 30, 2001

(65) Prior Publication Data

US 2001/0027223 A1 Oct. 4, 2001

(30) Foreign Application Priority Data

Apr. 3, 2000 (FR) .............................................. 00 04221

(51) Int. Cl.⁷ .......................... C08K 3/36; C09D 183/00
(52) U.S. Cl. ......................... 522/83; 522/84; 522/183; 522/99; 524/492; 524/493
(58) Field of Search .............................. 522/83, 84, 99, 522/172, 181, 182; 524/806, 832, 492, 493, 560

(56) References Cited

U.S. PATENT DOCUMENTS

| | | |
|---|---|---|
| 4,348,462 A | 9/1982 | Chung |
| 4,455,205 A | 6/1984 | Olson et al. |
| 4,468,504 A | 8/1984 | Kuemmel |
| 4,478,876 A | 10/1984 | Chung |
| 4,491,508 A | 1/1985 | Olson et al. |
| 4,822,828 A | 4/1989 | Swofford |
| 5,232,964 A | 8/1993 | Evans et al. |
| 5,260,350 A | 11/1993 | Wright |
| 5,374,483 A | 12/1994 | Wright |
| 6,136,912 A | 10/2000 | Jacquinot et al. |

FOREIGN PATENT DOCUMENTS

| | | | |
|---|---|---|---|
| EP | 0926170 | | 6/1999 |
| EP | 1 008 631 | | 6/2000 |
| FR | 2772777 A | * | 6/1999 |
| JP | 11-246789 | * | 9/1999 |

* cited by examiner

*Primary Examiner*—Susan Berman
(74) *Attorney, Agent, or Firm*—Anthony A. Bisulca; Scott E. Hanf

(57) ABSTRACT

Fluid silico-acrylic compositions, stable in the long term, polymerizable thermally and by radiatiion, by mechanism giving rise to free radicals, with a very low water (less than 1%) and volatile solvent content, containing silica, a silane, and a multifunctional acrylic monomer, in which the silica is in the form of indivualized particles with an average diameter with the range 9 amd 100 nm, not interconnected by siloxane bonds, the silane is a vinyl silane with the formula (I)

$$H_2C=CH-Si(OR)_3 \qquad (I)$$

in which R represents a methyl or ethyl radical, and the multifunctional (meth)acrylic monomer is an alkoxylated (meth)acrylate, method for preparation and use for the development of anti-scratch transparent and uncoloured varnishes, obtained by polymerization giving rise to free radicals by radiation (UV, electron bundles) or thermally.

19 Claims, No Drawings

SILICO-ACRYLIC COMPOSITIONS: METHOD FOR THEIR PREPARATION AND USE

FIELD OF THE INVENTION

The present invention relates to fluid silico-acrylic compositions, which are stable in the long term, polymerizable thermally or by radiation, by a mechanism giving rise to free radicals, and have a very low water and volatile solvents content, their preparation method and application of these to obtain abrasion and scratch-resistant coatings.

BACKGROUND OF THE INVENTION

Synthetic organic polymers and more particularly organic polymers which are transparent to sunlight such as certain (meth)acrylic or terephthalic resins are limited in their development by their low resistance to abrasion and their tendency to become scratched. To prevent these disadvantages, it is often proposed to protect them by means of an anti-scratch and anti-abrasion coating which can be obtained by photopolymerization of a film of an aqueous or nonaqueous composition containing silica particles and one or more polymerizable acrylic monomers, in the presence of a photoinitiator and, possibly, one or more silanes. Of these latter compositions, those described in the following patents may be cited amongst others: U.S. Pat. Nos. 4,348,462, 4,455,205, 4,478,876, 4,486,504, 4,491,508, 4,822,828, 5,260,350, 5,374,483.

EP-A-317.858 describes the preparation of compositions in a solvent medium containing a partial condensate of colloidal silica with a silane, at least 60% of which is of the vinyl silane type, a multi-functional (meth)-acrylate-type monomer, preferably water-soluble, and a lower alkanol, preferably isopropanol. It is this mixture in a solvent medium that is applied to synthetic films to obtain abrasion-resistant coatings. These compositions contain relatively large quantities of solvent that must be evaporated when they are used.

U.S. Pat. No. 5,232,964 describes the preparation of a composition which forms a transparent coating, which can be tinted and is abrasion resistant following hardening by radiation, comprising at least one multi-functional acrylate monomer, one silane, colloidal silica dispersed in a solvent plus a quaternary ammonium salt which makes it possible for the composition to be tinted.

EP 926.170 describes fluid silico-acrylic compositions which are transparent and uncoloured like water, stable in the long term, polymerizable thermally and by radiation, by a mechanism giving rise to free radicals, have a very low water content, below 1.5%, and contain silica, a vinyl silane and tripropylene glycol diacrylate.

Although the compositions described in these documents makes it possible to obtain high-performance coatings, both with regard to protection against abrasion and scratching, and with regard to adhesion, research is still going on into compositions with even better qualities, particularly as regards fluidity, stability over time and protection of the environment (reduction in volatile organic compounds or VOCs).

SUMMARY OF THE INVENTION

Now the applicant has discovered fluid compositions which are stable in the long term, polymerizable thermally or by radiation, by a mechanism giving rise to free radicals, with a high concentration of silica, a very low water and volatile solvent content, providing, after polymerization, a hard, adhesive coating with good resistance to abrasion and scratching.

DESCRIPTION OF THE PREFERRED EMBODIMENTS

The present invention therefore concerns fluid silico-acrylics, which are stable in the long term, and are polymerizable thermally or by radiation, by a mechanism giving rise to free radicals, with a very low water and volatile solvents content, containing silica, a silane and a multifunctional acrylic monomer, characterised by the fact that silica is in the form of individual particles having an average diameter between 9 and 100 nm, not connected to each other by siloxane bonds, and that the silane is a vinyl silane with the formula (I)

$$H_2C=CH-Si(OR)_3 \tag{I}$$

in which R represents a methyl or ethyl radical, and the multi-functional (meth)acrylic monomer is an alkoxylated (meth)acrylate.

This water content is very low, less than 1%.

In the present invention's system the term "polymerizable under radiation" indicates that the coating must be hardened under ultraviolet radiation in the present of a photoinitiator or under bundles of electrons without the need for a photoinitiator, and the term "polymerizable thermally" indicates that the coating must be hardened by heat treatment in the presence of a catalyst producing free radicals.

In the alkoxylated (meth)acrylate, the alkoxyl preferably contains no more than 10 carbon atoms, especially no more than 5 carbon atoms. The methoxy, ethoxy or proproxy radicals may be cited for example.

The object of the invention is more particularly compositions such as those defined above, characterised in that they contain from 5 to 60 wt. % silica.

Among these latter compositions, the object of the invention is especially compositions characterised in that they contain from 30 to 50% wt. % silica in the form of individual particles, not connected to each other by siloxane bonds. Particles having an average diameter within the range 12–50 nm are preferentially retained.

Among the above compositions, those characterised by the fact that they contain from 0.01 to 1 g may especially be cited, preferably between 0.05 and 0.7 g of vinyl silane with the formula (I) per gram of initial dry silica.

Under preferential conditions, the above compositions are characterised by the fact that the multi-functional (meth) acrylic monomer of the alkoxylated (meth)acrylate type is of the ethoxylated or propoxylated di(meth)acrylate type or by the fact that the multi-functional (meth)acrylic monomer of the alkoxylated (meth)acrylate type is of the ethoxylated or propoxylated tri(meth)acrylate type. Especially preferred compositions are characterised in that the ethoxylated triacrylate monomer is the ethoxylated trimethylolpropane triacrylate, or characterised in that the ethoxylated triacrylate monomer is the ethoxylated pentaerythritol triacrylate.

Under other preferential conditions, the above compositions are characterised by the fact that the multifunctional (meth)acrylic monomer of the alkoxylated (meth)acrylate type is of the ethoxylated or propoxylated tetra(meth) acrylate type.

The compositions according to the invention are stable in the long term; in fact it is noted that, under optimum storage conditions, i.e. in a cool, dark place, at the end of a period ranging from several weeks to several months after preparation of the product, there is still a clear, limpid, transparent solution. There is no noticeable sedimentation of the silica, nor formation of gels from the silica or the silanes. There is no appearance of the phenomenon of turbidity.

The compositions according to the invention are especially fluid. Their Brookfield viscosity after manufacture, determined at 20° C. with a 100 tr/mn Brookfield RVT device is low (below 1500 mPa.s), which makes it possible to use them as they are without subsequent dilution by solvents. This is especially favourable with a view to reducing volatile organic compounds (VOCs). They are also practically free of water and volatile solvents. They mostly contain less than 1% water.

If it is desirable to reduce the viscosity of the compositions according to the invention, solvents miscible with the multifunctional (meth)acrylates can be used.

According to the invention, the compositions especially preferred such as defined above can be prepared by a method characterised in that a preferably acid aqueous silica sol containing the desired quantity and grade of silica, the chosen quantity of vinyl silane of formula (I), the desired quantity of alkoxylated (meth)acrylate multifunctional monomer and isopropyl alcohol, designated IPA, are mixed at ambient temperature, under agitation, preferably in such a way that the quantity of vinyl silane of formula (I), is within the range 0.01 to 1 g per gram of initial dry silica, notably between 0.05 g and 0.7 g per gram of initial dry silica, and this mixture is then subjected to distillation under reduced pressure and under agitation, at a temperature below 50° C., until the water and volatile solvents are eliminated to obtain a composition according to the invention.

The silica particles, after elimination of the water and volatile solvents lose their hydrophilic character and are thus dispersed in the multifunctional alkoxylated (meth)acrylate monomer.

The stability of the compositions according to the invention is surprising and is particularly advantageous for their use.

In fact it is industrially very worthwhile to be able to obtain compositions free of solvent which remain stable in the long term.

The aqueous sol of acid silica is either available commercially, or prepared extemporaneously by treatment according to known techniques, with an ion-exchanging resin in acid form, of a commercial aqueous solution of silica having a pH of 8 to 10.

Aqueous sols of silica are available commercially, notably being marketed by the applicant under the name KLEBOSOL®.

The initial aqueous sols of acid silica contain up to 60 wt. % silica, in the form of individualised particles, with an average diameter within the range 9 to 100 nm, not connected with each other by siloxane bonds. They have a pH advantageously within the range 1 to 3 and preferably approx. 2.

Under completely advantageous realisation conditions, the silico-acrylic compositions according to the present invention contain less than 2%, especially less than 1% and particularly no quarternary ammonium salt.

The initial multifunctional alkoxylated (meth)acrylate monomers used in the invention have good compatibility with water as well as low toxicity which makes them advantageous in producing compositions according to the invention. On the other hand, thanks to their polyalkoxylated links, the multifunctional alkoxylated (meth)acrylate monomers provide the compositions according to the present invention with a good flexibility.

According to the invention, the vinyl silanes of formula (I) and the multifunctional alkoxylated (meth)acrylate monomers are commercial products.

The vinyltrimethoxysilane and the vinyltriethoxysilane are marketed for example by the company Sivento under the tradenames Dynasylan VTMO and Dynasylan VTEO respectively, and by the company Witco under the tradenames Silquest A-171 and Silquest A-151 respectively.

The ethoxylated trimetholpropane triacrylate is notably marketed by various companies: SR 454 marketed by Cray Valley, Ebecryl 1100 marketed by UCB/Radcure.

The ethoxylated pentaerythritol triacrylate is notably marketed by Servo Delden BV under the name RTT-193.

The compositions according to the invention have advantageous properties because of their high silica concentration, their fluidity and their stability over time. They can also be easily deposited on different types of support previously described, and hardened by a mechanism giving rise to free radicals thermally or by radiation (UV or electron bundles) leading to the formation of a thin film having good adhesion to the support and good resistance to abrasion and/or scratches, which makes them especially useful for the development of protective coatings or uncoloured and transparent anti-scratch varnish.

This is why the object of the present invention is also a method for protection of a synthetic organic polymer notably against scratches and abrasion, characterised in that a layer of an above composition is deposited on the said polymer, and the said composition is then hardened.

The compositions according to the invention possessing silica particles whose diameter is within the range 9 to 100 nm, and particularly between 12 and 50 nm, are therefore especially advantageous for obtaining anti-scratch varnishes on uncoloured and transparent plastics, such as optical glasses or transparent plastics materials which can be used in building and on other substrates (non-transparent plastics, glass, wood, metal).

The following examples illustrate the present invention. In these examples, the water dosages have been effected by the Karl Fischer method and the silica rates have been determined by calcination of a sample of known weight at 800° C.

EXAMPLES

Example 1

The following are mixed under agitation in a reactor at ambient temperature:

122.4 g of an acid silica sol containing 40 wt. % silica, i.e. 49 g silica with an average diameter of 50 nm, and 60% water, i.e. 73.4 g water, and having a pH of 2.

396.4 g isopropanol 26 g vinyltrimethoxysilane, i.e. 0.53 g vinyltrimethoxysilane per gram initial dry silica.

125 g of ethoxylated trimethylolpropane triacrylate with a molecular mass of 428.

The reactor is brought under reduced pressure of 50 to 110 mm of Hg and then gently heated in a double boiler so that the temperature of the boiler does not exceed 45° C. and that of the reactional medium 35° C. for 4 hours.

The water-isopropanol mixture is distilled so that the quantity of residual water is below 1%.

After filtration, a slightly yellow, limpid, transparent solution, stable in the long term, is obtained containing 30 wt. % silica and 0.3% water and having a Brookfield viscosity of 304 mPa.s determined at 20° C. (speed 100 tr/mn; mobile no. 2).

It is noted that under appropriate storage conditions, i.e. in a cool, dark place, at the end of 6 months following the preparation of the product, there is still a clear, limpid, homogenous, transparent, slightly yellow solution, which is stable in the long term, and no phenomenon of turbidity is therefore found.

In the same way, the coatings obtained with this composition have no film.

Example 2

The following are mixed under agitation in a reactor at ambient temperature:

192 g of an acid silica sol containing 30 wt. % silica, i.e. 57.6 g silica with an average diameter of 50 nm, and 70% water, i.e. 134 g water and having a pH of 2.

971 g isopropanol 6 g vinyltrimethoxylsilane, i.e. 0.1 g vinyltrimethoxysilane per gram of initial dry silica 136.4 g ethoxylated trimethylolpropane triacrylate.

Under conditions analogous to those described in example 1, after 6 hours of reaction at 35° C., the water-isopropanol mixture is distilled so that the quantity of residual water is below 1%.

A clear, limpid, transparent, slightly yellow solution which is stable in the long term is obtained, containing 29 wt. % silica and 0.4 wt. % water, and having a Brookfield viscosity of 180 mPa.s determined at 20° C. (speed 100 tr/mn; mobile no.2).

It is noted that under appropriate storage conditions, i.e. in a cool, dark place, at the end of 6 months after the preparation of the product, there is still a clear, liquid, homogenous, transparent, slightly yellow solution which is stable in the long term. Thus no turbidity phenomenon is noted. In the same way, the coatings obtained with this composition have no film.

Example 3

The following are mixed under agitation in a reactor at ambient temperature:

219 g of an acid silica sol containing 40 wt. % silica, i.e. 87.6 g silica with an average diameter of 12 nm and 60% water, i.e. 131.4 g water and having a pH of 2.

945 g isopropanol 6 g vinyltrimethoxylsilane, i.e. 0.07 g vinyltrimethoxysilane per gram of initial dry silica 206.4 g ethoxylated pentaerythritol triacrylate.

Under conditions analogous to those described in example 1, the water-isopropanol mixture is distilled so that the quantity of residual water is below 1%.

A clear, limpid, transparent, slightly yellow solution which is stable in the long term is obtained, containing 29 wt. % silica and 0.6 wt. % water, and having a Brookfield viscosity of 980 mPa.s determined at 20° C. (speed 100 tr/mn; mobile no.2).

It is noted that under appropriate storage conditions, i.e. in a cool, dark place, at the end of 6 months after the preparation of the product, there is still a clear, liquid, homogenous, transparent, slightly yellow solution which is stable in the long term. Thus no turbidity phenomenon is noted. In the same way, the coatings obtained with this composition have no film.

Example 4

The following are mixed under agitation in a reactor at ambient temperature:

200 g of an acid silica sol containing 30 wt. % silica, i.e. 60 g silica with an average diameter of 12 nm and 70% water, i.e. 140 g water and having a pH of 2.

1040 g isopropanol 16 g vinyltrimethoxylsilane, i.e. 0.27 g vinyltrimethoxysilane per gram of initial dry silica 124 g ethoxylated pentaerythritol triacrylate.

Under conditions analogous to those described in example 1, after 8 hours of reaction the water-isopropanol mixture is distilled so that the quantity of residual water is below 1%.

A slightly yellow, limpid, transparent solution which is stable in the long term is obtained, containing 32 wt. % silica and 0.6 wt. % water, and having a Brookfiield viscosity of 1470 mPa.s (speed 100 tr/mn; mobile no.4).

It is noted that under appropriate storage conditions, i.e. in a cool, dark place, at the end of 6 months after the preparation of the product, there is still a clear, limpid, homogenous, transparent, slightly yellow solution which is stable in the long term. Thus no turbidity phenomenon is noted. In the same way, the coatings obtained with this composition have no film.

Example 5

Example of use of formulations according to the invention for production of coatings resistant to abrasion and scratches.

a) First of all, the following formulation is prepared by mixing at ambient temperature (20° C.):

50 parts by weight of silica organosol of example 1

50 parts by weight of the urethane-acrylate oligomer Ebecryl 5129 (UCB Radcure)

5 parts by weight of photoinitiator IRGACURE 184 (Ciba Specialist Chemicals).

b) The mixture thus obtained is deposited on a polycarbonate support at a rate of approx. 50 g/m2. The polycarbonate support thus coated is placed on a conveyor moving at a speed of 25 meters/minute under a tunnel equipped with a mercury vapour tube with an average pressure of 120 W/cm (FUSION-SYSTEM) which emits ultraviolet radiation to harden the coating.

c) The coating's resistance to abrasion thus hardened has been evaluated by the Taber abrasion test with 2 CS 10 abrasive grinding wheels and a 500 g weight applied to each of them, followed by optical transmission measurement. The transmission percentage is 100% when the formulation indicated is used, whereas it is only 70% when a formulation containing no silica organosol according to example 1 is used. Thus a very clear improvement in the abrasion resistance of the coating containing the formulation of example 1 is noted.

d) The scratch resistance was measured according to the pencil hardness test. It is 7 H when the formulation indicated is used, whereas it is only 4 H when the formulation contains no silica organosol according to example 1. Thus a very clear improvement in the scratch resistance of the coating containing the formulation of example 1 is noted.

What is claimed is:

1. Fluid silica-acrylic compositions, stable in the long term, polymerizable thermally and by radiation, by mechanism giving rise to free radicals, with a very low water and volatile solvent content, containing silica, a silane and a multlfunctional acrylic monomer, wherein the silica is in the form of individualised particles with an average diameter in the range 9 to 100 nm, not interconnected by siloxane bonds, and the silane is a vinyl silane of the formula (I)

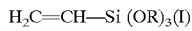

in which R represents a methyl or ethyl radical, and the multifunctional (meth)acrylic monomer is an alkoxylated (meth)acrylate not soluable in water, where the fluid silico-acrylic compositions have a Brookfield viscosity after manufacture below 1500 mPa.s.

2. Compositions according to claim 1, where said composition contain 5 to 60 wt. % silica.

3. Compositions according to claim 2, where said composition contain 30 to 50 wt. % silica.

4. Compositions according to claim 1, where said composition contain silica in the form of individualised particles, not interconnected by siloxane bonds, with an average diameter in the range 12 to 50 nm.

5. Compositions according to claim 1, where the quantity of vinyl silane of formula (I) is within the range 0.01 g to 1 g per gram initial dry silica.

6. Compositions according to claim 1, where the quantity of vinyl silane of formula (1) is within the range 0.05 g to 0.7 g per gram initial dry silica.

7. Compositions according to claim 1, where the multifunctional (meth)acrylic monomer of alkoxylated (meth)acrylate is ethoxylated or propoxylated di(meth)acrylate.

8. Compositions according to claim 1, where the multifunctional (meth)acrylic monomer of alkoxylated (meth)acrylate is ethoxylated or propoxylated tri(meth)acrylate.

9. Compositions according to claim 8, where the ethoxylated triacrylate monomer is the ethoxylated trimethylolpropane triacrylate.

10. Compositions according to claim 8, where the ethoxylated triacrylate monomer is the ethoxylated pentaerythritol triacrylate.

11. Compositions according to claim 1, where the multifunctional (meth)acrylic monomer of alkoxylated (meth)acrylate is ethoxylated or propoxylated tetra (meth)acrylate.

12. Method for preparation of a composition as defined in claim 1, comprising the steps of:

mixing, at ambient temperature under agitation, an aqueous solution of said silica, said vinylsilane of formula (I), said alkoxylated (meth)acrylate, and isopropyl alcohol; and distilling the resultant mixture under reduced pressure and under agitation, at a temperature below 50° C., so that the quantity of residual water is below 1%.

13. Method according to claim 12, where the initial aqueous silica sol is an acid sol.

14. Method according to claim 13, where the initial silica sol has a pH between 1 and 3.

15. A method of providing a transparent and uncoloured coating on a substrate to protect said substrate against abrasion comprising the steps of:

providing a substrate;

depositing a coating composition to said substrate, where said coating composition is the composition of claim 1; and hardening said coating composition.

16. A method according to claim 15, where hardening said coating composition is done thermally or/and by radiation, by a radical mechanism.

17. A method of providing a transparent and uncoloured varnish on a substrate to protect said substrate against scratch comprising the steps of:

providing a substrate;

depositing a coating composition to said substrate, where said coating composition is the composition of claim 1; and hardening said coating composition.

18. A method according to claim 17, where hardening said coating composition is done thermally or/and by radiation, by a radical mechanism.

19. Compositions according to claim 1, wherein the low water content is below 1%.

* * * * *